United States Patent [19]

Schulze

[11] 4,119,981
[45] Oct. 10, 1978

[54] SINGLE LENS REFLEX CAMERA AND EXPOSURE MEASURING MECHANISM THEREFOR

[75] Inventor: Heinz Schulze, Dresden, German Democratic Rep.

[73] Assignee: Veb Pentacon Dresden Kamera-und Kinowerke, Dresden, German Democratic Rep.

[21] Appl. No.: 775,612

[22] Filed: Mar. 8, 1977

[51] Int. Cl.² .................. G03B 19/12; G03B 7/20; G03B 17/00
[52] U.S. Cl. ...................... 354/152; 354/46; 354/289
[58] Field of Search .............. 354/46, 60, 286, 152, 354/289, 273

[56] References Cited

U.S. PATENT DOCUMENTS 3,872,482  3/1975  Akujoma ................ 354/152 X

FOREIGN PATENT DOCUMENTS 2,551,571  5/1977  Fed. Rep. of Germany ......... 354/289
1,371,554  10/1974  United Kingdom ................ 354/289

*Primary Examiner*—Donald A. Griffin
*Attorney, Agent, or Firm*—William Anthony Drucker

[57] ABSTRACT

A single-lens reflex camera having an interchangeable objective lens and an exposure measuring circuit is provided with an adjusting device capable of being connected to a coupling element of a diaphragm stop adjuster and movable in opposition to a spring in accordance with diaphragm values to which a diaphragm detent setting device can be adjusted. The adjusting device is movable by its spring between a position corresponding to the initial diaphragm setting to a basic position on removal of the objective lens. Formed on the adjusting device is a lug which actuates a switch in the exposure measuring circuit to open circuit the latter when the adjusting device is in the basic position.

1 Claim, 2 Drawing Figures

4,119,981

SINGLE LENS REFLEX CAMERA AND EXPOSURE MEASURING MECHANISM THEREFOR

BACKGROUND OF THE INVENTION

The invention relates to a single-lens relfex camera which, for the purpose of exposure measurement in the path of the taking rays with the diaphragm open, is provided with an adjusting device capable of being connected to a coupling element of the diaphragm stop adjuster on the lens side and movable in opposition to its restoring spring in accordance with the diaphragm values to which the diaphragm detent setting device can be adjusted.

Exposure measuring devices are known which are built into single-lens reflex cameras and which provide the desired measuring result by an internal measuring operation with an open diaphragm. This necessitates special lens units having coupling elements which are adapted to the exposure measuring device on the camera side and which are connected with the diaphragm detent setting device on the lens side. The camera can likewise be fitted with interchangeable objectives having no such coupling elements and suitable for taking photographs, but no exposure measurement is possible. In view of this, known cameras have detent devices by which the restoring movement of the adjusting device of the exposure meter is limited to a position corresponding to the maximum diaphragm aperture. A detent device of this kind enables exposure measurement to be effected with the diaphragm in the operating position.

On the removal of the interchangeable objective the adjusting device remains in the position corresponding to the said operating diaphragm.

Further known means adopted for exposure measurements with the diaphragm in the operating position consist of interchangeable objectives each of which has a rigid control element which is operative independent of the diaphragm setting device and by which, when the interchangeable objective is mounted, the adjusting device of the exposure meter can be held, in opposition to the force of its restoring spring, in the initial position corresponding to the maximum diaphragm aperture. The camera itself does not have to be fitted with any detent devices for measurement with operating diaphragm. When these interchangeable objectives are removed the adjusting device is moved by its restoring spring into a basic position which differs from the position corresponding to the initial diaphragm.

The purpose of the invention is to simplify the structure of the camera still further.

SUMMARY OF THE INVENTION

According to the invention I provide a single lens mirror reflex camera comprising a housing adapted to receive an interchangeable objective lens of the kind in which light measurement is made with maximum diaphragm setting with subsequent stopping down to the set diaphragm aperture value at the instant of picture taking, incorporating therein an adjustable diaphragm and a diaphragm stop setting device and having extending therefrom a movable coupling element, an exposure measurement circuit within the housing having a photo electric light sensing device arranged in the light path within the camera housing, a control means within said housing movable by said coupling member to positions in accordance with the diaphragm aperture values set and to an end position outside the aperture setting range on removal of the objective lens, a return spring connected between said control means and a fixed part of said housing to maintain engagement between said control means and said coupling member, a switch in the circuit of the exposure measurement circuit, a control slide within the housing capable of opening and closing said switch, and a lug on said control means cooperating with said control slide to move the latter into a position to open the switch when the circuit means occupies said end position.

BRIEF DESCRIPTION OF DRAWINGS

The invention will be explained by way of example with reference to the acompanying drawings in which:

The measuring mechanism 3, adjustable in accordance with the time scale 2, is rotatably mounted in a camera housing 1 of which one portion is shown (cf. FIG. 1). The measuring mechanism 3 is connected in a known manner to a photo-electric converter 7 situated in the path of the taking rays. The follow-up mark 5 of the adjusting device 6 corresponds in its position with the measuring indicator 4. The adjusting device 6 is rotatable concentrically with the measuring mechanism 3. The restoring spring 8 tends to rotate the adjusting device 6 in a clockwise direction. A number of diaphragm scales 10a, 10b and 10c are situated opposite to the indicator 9 provided on the adjusting device 6.

Figure 1:
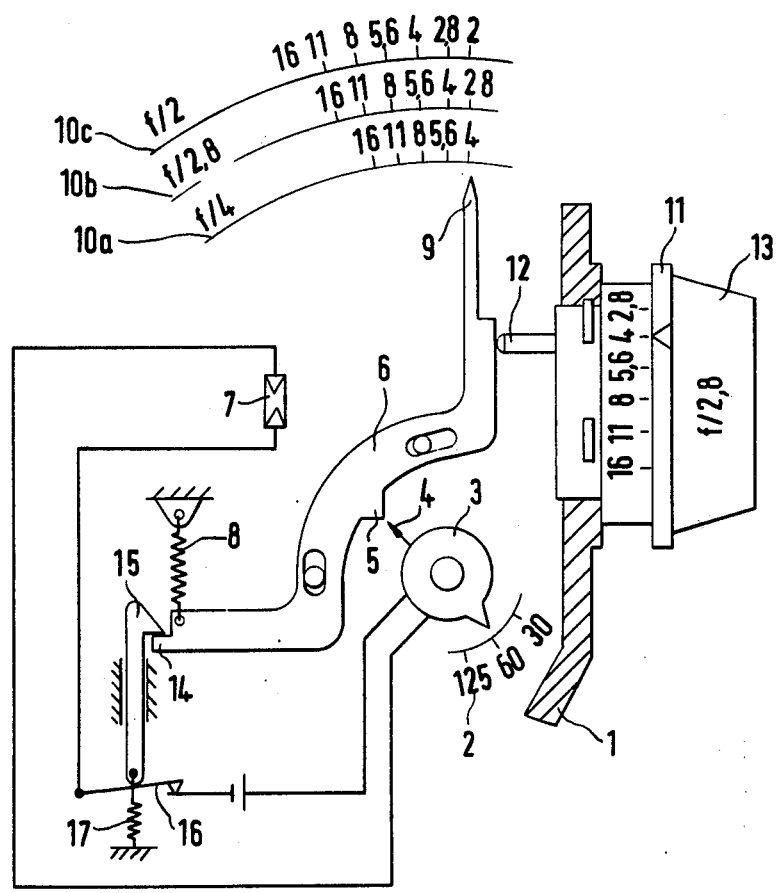
FIG. 1 is a system according to the invention, with the interchangeable objective mounted.

These diaphragm scales 10a, 10b and 10c serve to indicate the diaphragm values in the case of interchangeable objectives with a preselection diaphragm of which the diaphragm detent setting device 11 is connectable via a coupling element 12 to the adjusting device 6 of the exposure meter. Each time an initial aperture is selected the indicator 9 will assume the corresponding position, thus automatically taking different initial apertures into account.

The adjusting device 6 has a control lug 14 with which the control rod 15 interacts. The control spring 17 tends to cause the control rod 15 to close the main swtich.

Figure 2:
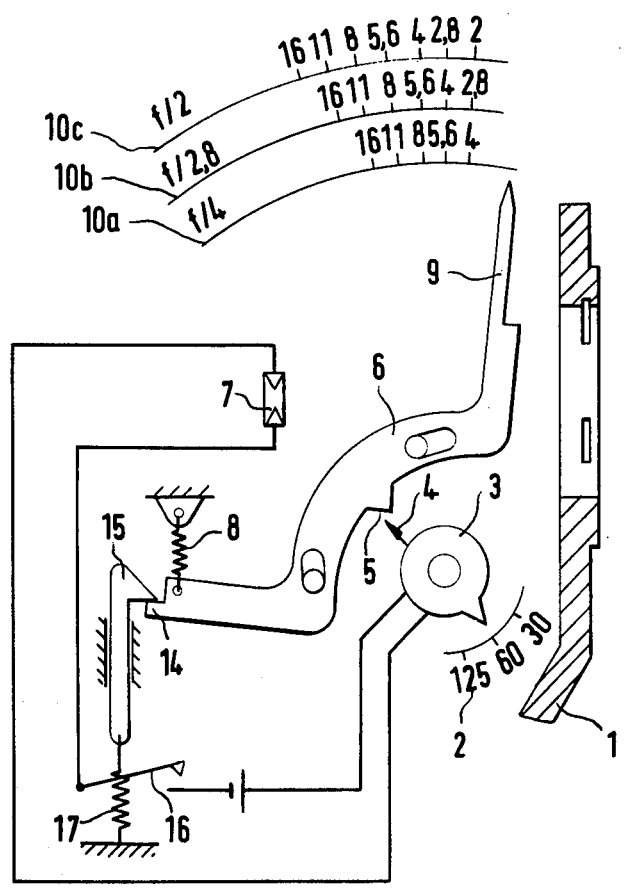
FIG. 2 is the system shown in FIG. 1, with the interchangeable objective removed.

When the interchangeable objective 13 has been removed (cf. FIG. 2) the restoring spring 8 moves the control rod 15 in opposition to the control spring 17, via the control lug 14, so that the main switch 16 is opened. When the interchangeable objective 13 is mounted the coupling element 12 moves the adjusting device 6 in opposition to its restoring spring 8. In this process the control lug 14 is pivoted downwards so that the control rod 15, as a result of the control spring 17, closes the main switch 16.

The movement of the control rod 15 can also be utilized for other functions of the camera.

I claim:

1. In a single lens mirror relfex camera comprising a housing adapted to receive an interchangeable objective lens of the kind in which light measurement is made with maximum diaphragm setting with subsequent stopping down to the set diaphragm aperture value at the instant of picture taking, incorporating therein an adjustable diaphragm and a diaphragm stop setting device and having extending therefrom a movable coupling element, an exposure measurement circuit within the housing having a photo electric light sensing device arranged in the light path within the camera housing, a control means within said housing movable by said coupling member to positions in accordance with the diaphragm aperture values set and to an end position outside the aperture setting range on removal of the objective lens, a return spring connected between said control means and a fixed part of said housing to maintain engagement between said control means and said coupling member, the provision of (a) a switch in the circuit of the exposure measurement circuit;
(b) a control slide within the housing capable of opening and closing said switch, and
(c) a lug on said control means cooperating with said control slide to move the latter into a position to open the switch when the control means occupies said end position.

* * * * *